United States Patent
Kaplan (10) Patent No.: US 7,477,759 B2
(45) Date of Patent: Jan. 13, 2009

(54) ADAPTIVE ARTIFICIAL VISION METHOD AND SYSTEM

(75) Inventor: Frederick Kaplan, Paris (FR)

(73) Assignee: SONY France S.A., Clichy (FR)

( * ) Notice: Subject to any disclaimer, the term of this patent is extended or adjusted under 35 U.S.C. 154(b) by 977 days.

(21) Appl. No.: 10/680,006

(22) Filed: Oct. 7, 2003

(65) Prior Publication Data

US 2004/0071347 A1 Apr. 15, 2004

(30) Foreign Application Priority Data

Oct. 8, 2002 (EP) .................................. 02292478

(51) Int. Cl.
*G06K 9/00* (2006.01)
(52) U.S. Cl. ....................................................... 382/103
(58) Field of Classification Search ................ None
See application file for complete search history.

(56) References Cited

U.S. PATENT DOCUMENTS

| | | | | |
|---|---|---|---|---|
| 4,633,506 | A * | 12/1986 | Kato ............................ | 382/236 |
| 5,150,426 | A * | 9/1992 | Banh et al. .................... | 382/103 |
| 6,681,031 | B2 * | 1/2004 | Cohen et al. ................. | 382/103 |
| 6,999,604 | B1 * | 2/2006 | Kim et al. .................... | 382/107 |
| 2002/0126880 | A1 * | 9/2002 | Dobashi ...................... | 382/118 |
| 2005/0041102 | A1 * | 2/2005 | Bongiovanni et al. ....... | 348/155 |

* cited by examiner

*Primary Examiner*—Matthew C. Bella
*Assistant Examiner*—Alex Liew
(74) *Attorney, Agent, or Firm*—Oblon, Spivak, McClelland, Maier & Neustadt, P.C.

(57) ABSTRACT

The adaptive artificial vision method comprises the following steps: (a) defining successive couples of timesteps ($t_{-1}$, t; t, $t_{+1}$; ... ) synchronized by a clock (101), (b) comparing two successive images ($I_{t-}$, $I_t$; $I_t$, $I_{t+1}$, ... ) from an input device (102, 103) at each couple of synchronized timesteps ($t_{-1}$, t; t, $t_{+1}$; ... ) spaced by a predetermined time delay $\tau_0$ for obtaining a delta image $\Delta_t$ which is the result of the computation of the distance between each pixel of the two successive images ($I_{t-1}$, $I_t$; $I_t$, $I_{t+1}$, ... ) in view of characterizing movements of objects, (c) extracting features from the delta image $\Delta_t$ for obtaining a potential dynamic patch $P_t$ which is compared with dynamic patches previously recorded in a repertory which is progressively constructed in real time from an initial void repertory, (d) selecting the closest dynamic patch $D_i$ in the repertory or if no sufficiently close dynamic patch still exists, adding the potential dynamic patch $P_t$ to the repertory and therefore obtaining and storing a dynamic patch $D_i$ from the comparison of two successive images ($I_{t-1}$, $I_t$; $I_t$, $I_{t+1}$, ... ) at each couple of synchronized timesteps ($t_{-1}$, t; t, $t_{+1}$; ... ), and (e) temporally integrating stored dynamic patches Di of the repertory in order to detect and store stable sets of active dynamic patches representing a characterization of a reoccuring movement or event which is observed. A process of static pattern recognition may then be efficiently used.

16 Claims, 6 Drawing Sheets

ADAPTIVE ARTIFICIAL VISION METHOD AND SYSTEM

BACKGROUND OF THE INVENTION

1. Field of the Invention

The present invention relates to an adaptive artificial vision method and to an adaptive artificial vision system.

2. Technical Background

In most artificial vision systems, objects are either pregiven or they do not exist.

Some systems perform image segmentation based on the particular characteristics of an image (color, boundaries, etc.). These systems have no notion of objects. They just extract regions which seem interesting in themselves. They work well if the background on which the "objects" are presented is known or strongly constrained (e.g. colored objects on a white floor). In such cases the segments automatically extracted can be considered as the "contour" of some objects.

Other systems perform object identification given a set of predefined objects that they use as models. If the models are of sufficiently good quality, performances of such systems can be very good. See for example the handbook from S. Ullman entitled "High-level vision: object recognition and visual cognition", MIT Press, Boston, Mass., USA, 1996.

Unfortunately in some situations, neither of these two conditions can be met. This is particularly true, in the case of robots evolving in natural unknown environment, trying to discover the "objects" present without knowing them in advance. In such cases, segmenting and recognizing objects become a bootstrapping problem that can be summarized in the following way:

Segmentation algorithms do not work well in real-life conditions if no template of the objects is provided.

Templates of the objects cannot be built without a good segmentation algorithm.

This situation leads to a technological deadlock.

SUMMARY OF THE INVENTION

The present invention aims at overcoming the above-mentioned drawbacks and at enabling efficient bootstrapping of artificial visual recognition even in an unknown environment where objects which are not known in advance are present.

These aims are obtained by an adaptive artificial vision method comprising the following steps:

(a) defining successive couples of synchronized timesteps $(t_{-1}, t; t, t_{+1}; \ldots)$ such that the time difference $\tau$ between two synchronized timesteps $(t_{-1}, t; t, t_{+1}; \ldots)$ of a couple of synchronized timesteps is equal to a predetermined time delay $\tau_0$, (b) comparing two successive images $(I_{t-1}, I_t; I_t, I_{t+1}, \ldots)$ at each couple of synchronized timesteps $(t_{-1}, t; t, t_{+1}; \ldots)$ spaced by said predetermined time delay $\tau_0$ for obtaining a delta image $\Delta_t$ which is the result of the computation of the distance between each pixel of said two successive images $(I_{t-1}, I_t; I_t, I_{t+1}, \ldots)$ in view of characterizing movements of objects between said two successive images $(I_{t-1}, I_t; I_t, I_{t+1}, \ldots)$, (c) extracting features from said delta image $\Delta_t$ for obtaining a potential dynamic patch $P_t$ which is compared with dynamic patches previously recorded in a first repertory $R_d$ which is progressively constructed in real time from an initial void repertory, (d) selecting the closest dynamic patch $D_t$ in the first repertory $R_d$ or if no sufficiently close dynamic patch still exists, adding the potential dynamic patch $P_t$ to the first repertory $R_d$ and therefore obtaining and storing a dynamic patch $D_t$ from the comparison of two successive images $(I_{t-1}, I_t; I_t, I_{t+1}, \ldots)$ at each couple of synchronized timesteps $(t_{-1}, t; t, t_{+1}; \ldots)$, and (e) temporally integrating stored dynamic patches $D_t$ of the first repertory $R_d$ in order to detect and store stable sets of active dynamic patches representing a characterization of a reoccuring movement or event which is observed.

When stable sets of active dynamic patches representing a characterization of a reoccuring movement have been detected, the center of the movement is identified and static patches which are at a predetermined distance d from the movement center and are obtained by a process of static pattern recognition are analyzed to constitute at a given timestep a set of active static patches $S_i$ which are stored in a second repertory $R_s$.

Stored static patches $S_i$ of the second repertory $R_s$ are spatially integrated in order to detect and store stable sets of active static patches representing a characterization of an object which is recurrently involved in observed known reoccuring movements.

According to a particular embodiment, the process of static pattern recognition and production of static patches is initiated after stable sets of active dynamic patches representing a characterization of a reoccuring movement have been detected.

According to another particular embodiment, the process of static pattern recognition and production of static patches is initiated at the same time as the process of dynamic movement recognition and production of dynamic patches and when stable sets of active dynamic patches representing a characterization of a reocccuring movement have been detected, the process of static pattern recognition is continued exclusively with static patches which are located in a restricted area of the image which is centered on said identified movement center.

According to a specific embodiment, during the computation of the distance between each pixel of two successive images $(I_{t-1}, I_t)$, a filter function $f_{th}$ is used to keep only the most significant differences and therefore obtain a delta image $\Delta_t$ such that $$\Delta_t = f_{th}(\|(I_{t-1}, I_t)\|).$$

The filter function $F_{th}$ may be a threshold function.

According to a particular embodiment, the step of extracting features from the delta image $\Delta_t$ comprises computing a gaussian color model of the distribution for each color component.

According to a preferred embodiment, static patches are obtained on the basis of salient points (x,y) in an image $I_t$ provided at a synchronized timestep t when a salient point (x,y) is detected, a region $R_{x,y}$ corresponding to the surrounding pixels is defined and features are extracted from this region $R_{x,y}$ to define a potential static patch $S_{x,y}$.

In such a case, the extraction of features from the region $R_{x,y}$ may comprise measuring the color change of a pixel compared to its neighbors and computing a color model of the color distribution in the region $R_{x,y}$.

Successive couples of synchronized timesteps $(t_{-1}, t; T+t_{-1}; T+t; \ldots)$ are separated by a period of time T which is equal to n times the predetermined time delay $\tau_0$, where n is an integer which is positive or equal to zero.

However preferably successive couples of synchronized timesteps $(t_{-1}, t; t, t_{+1}; \ldots)$ are contiguous without any time interruption between two successive couples of synchronized timesteps $(t_{-1}, t; t, t_{+1})$.

The method according to the invention may further comprise the step of detecting transitions between stable sets of active dynamic patches representing a characterization of reoccuring movements and of constructing transition graphs for predicting complex events comprising a sequence of identified movements.

The invention further relates to an adaptive artificial vision system comprising:

- a clock for defining successive couples of synchronized timesteps ($t_{-1}$, t; t, $t_{+1}$; ...) such that the time difference $\tau$ between two synchronized timesteps ($t_{-1}$t; t, $t_{+1}$; ...) of a couple of synchronized timesteps is equal to a predetermined time delay $\tau_0$,
- inputting means for inputting images ($I_{t-1}$, $I_t$; $I_t$, $I_{t+1}$, ...) provided by a camera at said synchronized timesteps ($t_{-1}$, t; t, $t_{+1}$; ...),
- first comparator means for comparing two successive images ($I_{t-1}$, $I_t$; $I_t$, $I_{t+1}$, ...) inputted at each couple of synchronized timesteps ($t_{-1}$, t; t, $t_{+1}$; ...) spaced by said predetermined time delay $\tau_0$ for obtaining a delta image $\Delta_t$ which is the result of the computation of the distance between each pixel of said two successive images ($I_{t-1}$, $I_t$; $I_t$, $I_{t+1}$, ...),
- first memory means ($M_d$) for storing dynamic patches $D_i$ representing elementary visual parts for describing characterized movements of objects,
- feature extraction means for extracting features from said delta image $\Delta_t$ and producing a potential dynamic patch $P_t$,
- second comparator means for comparing a potential dynamic patch $P_t$ which is compared with dynamic patches previously recorded in said first memory means ($M_d$),
- selection means for selecting the closest dynamic patch $D_i$ in the first memory means ($M_d$) or if no sufficiently close dynamic patch still exists, for recording the potential dynamic patch $P_t$ into the first memory means so that a dynamic patch $D_i$ is stored in the first memory means for each comparison of two successive images ($I_{t-1}$, $I_t$; $I_t$, $I_{t+1}$, ...) at each couple of synchronized timesteps ($t_{-1}$, t; t, $t_{+1}$; ...),
- first temporal integration means comprising computing means for computing during a time $T_{F1}$ corresponding to a predetermined number N1 of couples of synchronized timesteps the frequency of each dynamic patch $D_i$ stored in the first memory means and threshold means for defining a set of active dynamic patches comprising dynamic patches $D_i$ whose frequency is higher than a predetermined threshold, and,
- second temporal integration means comprising computing means for computing during a time $T_{F2}$ corresponding to a predetermined number N2 of couples of synchronized timesteps the frequency of each set of defined active dynamic patches and threshold means for defining a stable set of dynamic patches corresponding to a reoccuring movement for each set of active dynamic patches whose frequency is higher than a predetermined threshold.

The adaptive artificial vision system further comprises means for identifying the center of a reoccuring movement represented by a stable set of active dynamic patches and means for triggering static pattern recognition for analyzing static patches which are at a predetermined distance d from said center of a reoccuring movement.

BRIEF DESCRIPTION OF THE DRAWINGS

Specific embodiments of the present invention will now be described by way of example only, with reference to the accompanying drawings, in which.

DETAILED DESCRIPTION OF THE PREFERED EMBODIMENTS

The adaptive artificial vision system according to the invention is conceived in such a manner that it is capable of bootstrapping object and event recognition.

The method and system according to the invention start with very crude recognition capabilities. The system may be called impressionist since it is adapted to perceive patches which are elementary visual parts for describing dynamic or static events. A dynamic event is usually defined by a movement whereas a static event is defined by an object.

The patches are constructed by the system to describe its visual perception at the lowest level. As the system accumulates visual experiences, it attempts to integrate patches together in order to discover stable sets. This integration happens both in the time and the spatial domain. After a while, the system becomes capable of recognizing reoccuring movements. After reaching this stage, it tries to extract the structure of objects involved in the movements it detects. By these means, it begins to be able to recognize these objects even when they are not moving. Stage after stage, starting from scratch, this artificial system learns to structure its perception into more and more complex representations.

Stable patch sets constitute a higher level representation of things happening and present in the environment (events and objects). Furthermore the way dynamic patch sets are constructed directly influences the way static patch sets are processed. In practice, good dynamic recognition comes first and helps static recognition to get off the ground.

The process of dynamic recognition will now be described in a more detailed manner with reference to FIGS. 1, 2 and 7.

A clock 101 defines successive couples of synchronized timesteps such as $t_{-1}$, t. The time difference $\tau$ between two synchronized timesteps, e.g. $t_{-1}$, t of a couple of synchronized timesteps, is equal to a predetermined time delay $\tau_0$.

Successive couples of synchronized timesteps, e.g. $t_{-1}$, t; $T+t_{-1}$, T+t; ... are separated by a period of time T which is equal to n times the predetermined time delay $\tau_0$, where n is an integer which is positive or equal to zero.

Preferably n=0 and successive couples of synchronized timesteps $t_{-1}$, t; $t_{+1}$; ... are contiguous without any time interruption between two successive couples of synchronized timesteps.

Images of the environment are obtained by a camera 103 such as a video camera, and inputted to the system via an inputting circuit 102 synchronized by the clock 101. Digital images $I_{t-1}$, $I_t$, $I_{t+1}$, ... of scenes viewed by the camera 103 are therefore inputted by the inputting circuit 102 to a first comparator 104 at defined successive timesteps $t_{-1}$, t; $t_{+1}$; ...

In the following description it will be assumed that successive couples of synchronized timesteps $t_{-1}$, t; $t_{+1}$; ... are contiguous (i.e. n=0 and $T=n\tau_0=0$).

A dynamic patch is obtained by comparing two successive images $I_{t-1}$, $I_t$; $I_t$, $I_{t+1}$; ... inputted to the first comparator 104 at each couple of synchronized timesteps $t_{-1}$, t; t, $t_{+1}$; ... spaced by the predetermined time delay $\tau_0$.

A delta image $\Delta_t$ constitutes the result of the computation of the distance between each pixel of two successive images $I_{t-1}$, $I_t$; $I_t$, $I_{t+1}$, ... in view of characterizing events (movements of objects) which occurred between the two successive images $I_{t-1}$, $I_t$; $I_t$, $I_{t+1}$, ...

A filter function such as a threshold function $f_{th}$ may be included in the first comparator 104 in order to keep only the most significant differences.

In such a case, $\Delta_t = f_{th}(\|I_t - I_{t-1}\|)$ when a couple of images $I_{t-1}$, $I_t$ is considered.

A memory $M_d$ is used for storing dynamic patches $D_i$ representing elementary visual parts for describing characterized movements of objects.

The delta image $\Delta_t$ is applied to a module 105 which extracts features from the delta image $\Delta_t$ and produces a potential dynamic patch $P_t$.

The module 105 for extracting features of the delta image $\Delta_t$ may use different known techniques.

For example a gaussian color model of the distribution for each color component may be computed by the module 105.

Alternatively, the step of extracting features from the delta image $\Delta_t$ in the module 105 may comprise using histograms to model the distribution for color components, shape or texture.

In the case of a color model, a potential dynamic patch $P_t$ represents a color distribution of the delta image $\Delta_t$.

The memory $M_d$ comprises a repertory $R_d$ which is progressively constructed in real time from an initial void repertory.

In a module 106, a potential dynamic patch $P_t$ is compared with dynamic patches previously recorded in the repertory $R_d$ of the memory $M_d$.

A selection module 107 permits to select the closest dynamic patch $D_i$ in the memory $M_d$ or, if this is an initial step or if no sufficiently close dynamic patch still exists, the selection module 107 permits to record the potential dynamic patch $P_t$ in the repertory $R_d$ within the memory $M_d$.

A dynamic patch $D_i$ is therefore stored in the memory $M_d$ for each comparison of two successive images at each couple of synchronized timesteps.

Figure 2:
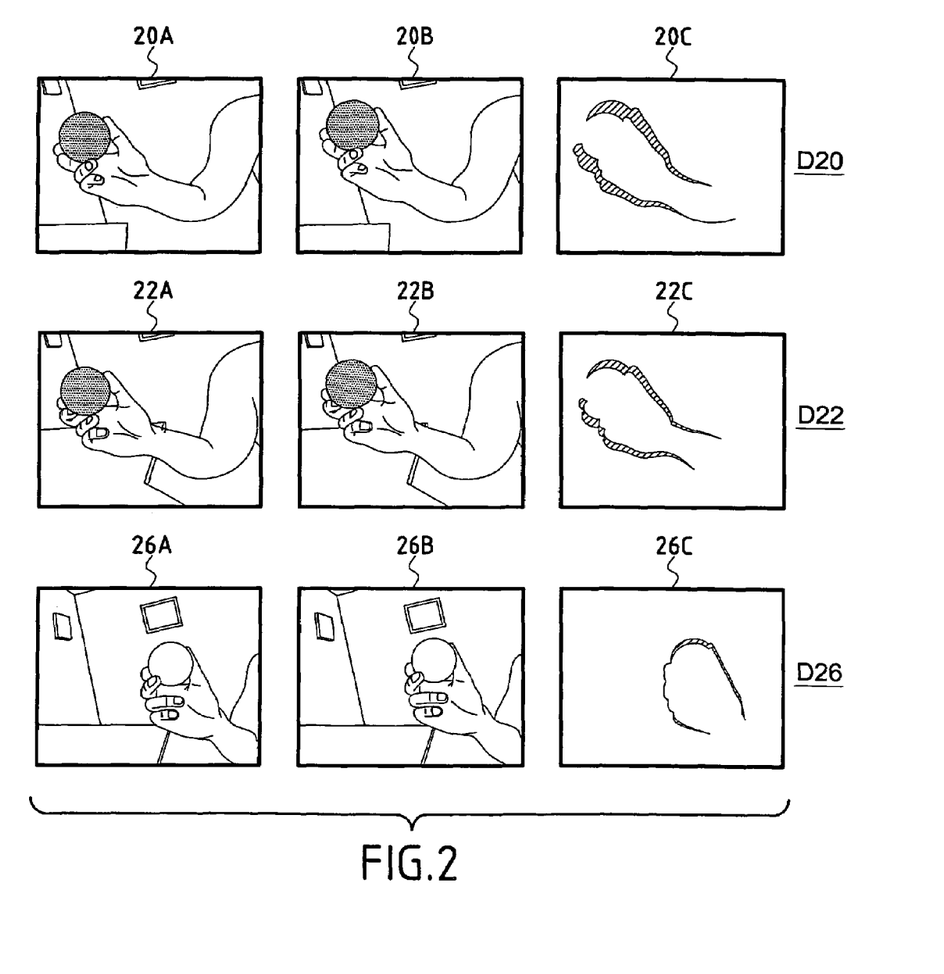
FIG. 2 shows those sets of pictures illustrating the construction process of three different dynamic patches contributing to recognizing the event shown on FIG. 1.

On FIG. 2, references 20A and 20B illustrate an example of two successive images showing a first movement of a hand with a ball of a certain color (e.g. red). Reference 20C shows the delta image $\Delta_t$ corresponding to the successive images 20A, 20B. A dynamic patch $D_{20}$ is constructed from delta image 20C and is stored in the dynamic patch repertory $R_d$.

Similarly, references 22A and 22B illustrate an example of two successive images showing a second movement of a hand with a ball of the same red color and reference 22C shows the delta image corresponding to the images 22A, 22B and enabling the construction of a dynamic patch $D_{22}$.

References 26A, 26B illustrate an example of another couple of two successive images showing a third movement of a hand with a ball of another color, e.g. a yellow ball, and reference 26C shows the delta image corresponding to the images 26A, 26B and enabling the construction of a dynamic patch $D_{26}$.

Dynamic patches $D_{20}$, $D_{22}$, $D_{26}$ are all stored in the repertory $R_d$ of the memory $M_d$.

Figure 7:
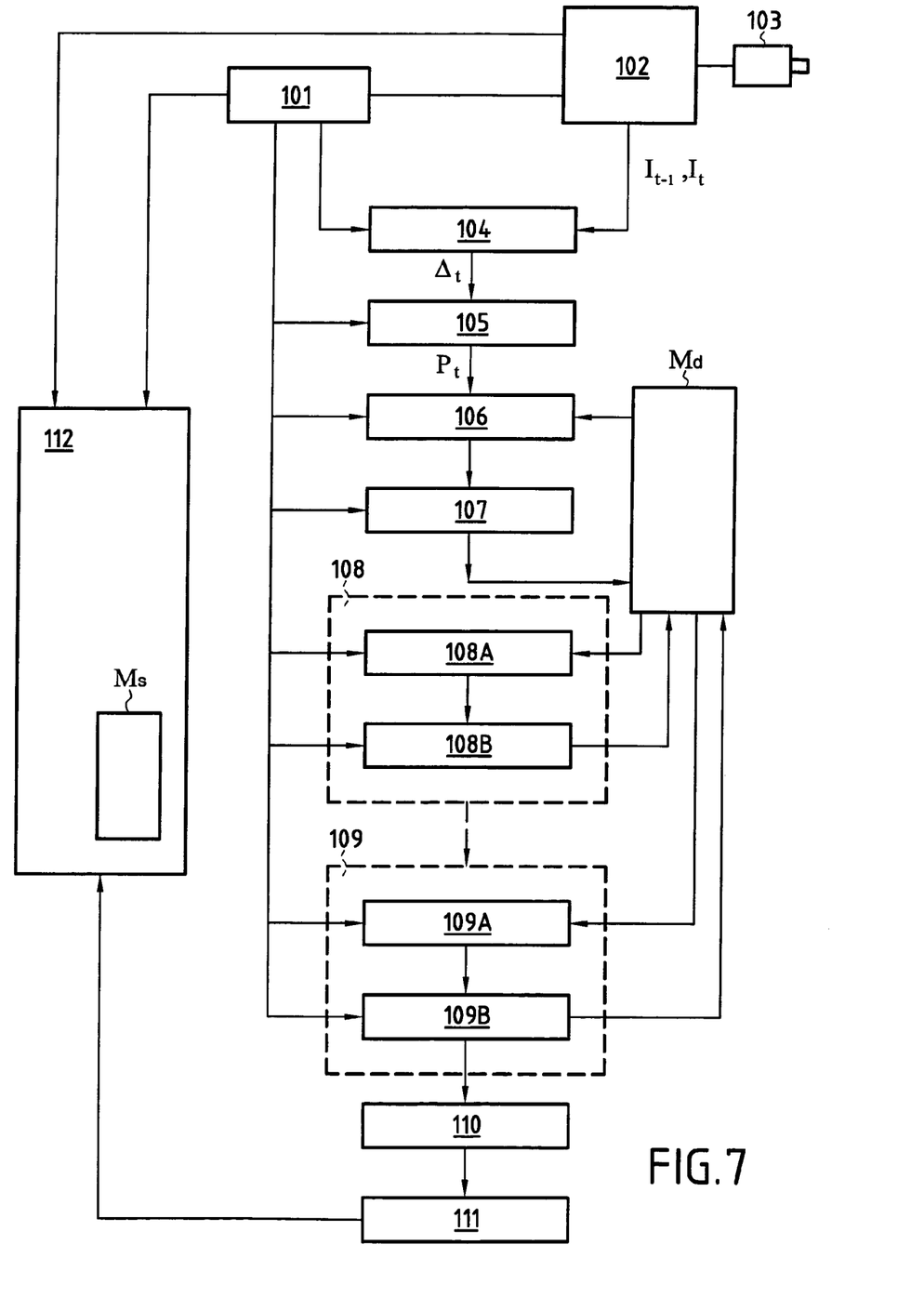
FIG. 7 is a diagram schematically illustrating an example of architecture of an adaptive artificial vision system according to the invention.

The module 108 of FIG. 7 constitutes first temporal integration means and comprises computing means 108A for computing during a time $T_{F1}$ corresponding to a predetermined number N1 of couples of synchronized timesteps the frequency of each dynamic patch $D_i$ stored in the register $R_d$. Threshold means 108B permit to define a set of active dynamic patches with the dynamic patches $D_i$ whose frequency is higher than a predetermined threshold.

Then the frequency of each patch $D_i$ of the repertory $R_d$ during the last N1 couples of timesteps is computed. All the patches $D_i$ which frequency is above a given threshold are said to be active. At a given timestep, there is a set of active patches which are supposed to characterize the event which is experienced by the system.

Figure 1:
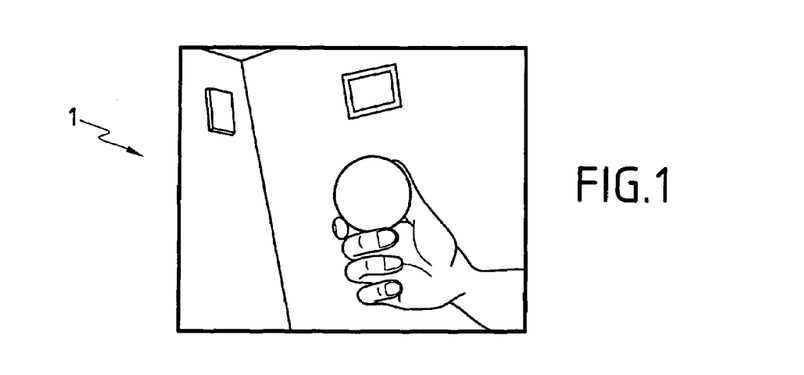
FIG. 1 is a picture illustrating an example of a reoccuring event which may be observed and detected by a system according to the present invention.

For example, at the timestep t, with picture 1 of FIG. 1, three patches may be considered to be active: $A_t = D_{20}$, $D_{22}$, $D_{26}$. The picture 1 of FIG. 1 shows a moving hand with a yellow ball and may be deemed to be defined by the dynamic patches $D_{20}$, $D_{22}$, $D_{26}$ corresponding to the delta images 20C (first movement of the hand with a red ball), 22C (second movement of the hand with a red ball) and 26C (third movement of the hand with a yellow ball).

The system shown on FIG. 7 further comprises a module 109 constituting second temporal integration means.

The module 109 comprises computing means 109A for computing during a time $T_{F2}$ corresponding to a predetermined number N2 of couples of synchronized timesteps the frequency of each set $A_t$ of defined active dynamic patches such as $D_{20}$, $D_{22}$, $D_{26}$.

Threshold means 109B permit to define a stable set of dynamic patches corresponding to a reoccuring movement for each set $A_t$ of active dynamic patches whose frequency is higher than a predetermined threshold.

Thus the frequency of each active patch is computed and if some active patch set reoccurs sufficiently often, it is considered to be stable. It is in that case assumed that it corresponds to something interesting happening regularly in the environment. An event of higher level than the patches is therefore created. Such a dynamic event, which for example in FIG. 1 may be defined as a "showing yellow ball" event, is created and defined by the set of patches involved in the reoccuring movement. In the example of FIG. 1, the event is defined by the set of patches $D_{20}$, $D_{22}$, $D_{26}$ and these data are stored in memory $M_d$.

As soon as such a dynamic event is constructed, a special detector is created triggering each time an active patch set corresponds to this event. FIG. 2 shows an example of such a detection. The user is showing a yellow ball to the camera. The system characterizes this event with the active patch set $A_t = (D_{20}, D_{22}, D_{26})$. The system recognizes this set as a dynamic event, which has already appeared several times in the past. To have a better insight of how the recognition works, FIG. 2 shows for each of the patches involved in the detection the two images that were at the origins of the initial patch creation. $D_{20}$ and $D_{22}$ were created when a red ball was shown to the camera and $D_{26}$ for a similar event involving this time a yellow ball. The two first are characteristics of the special movement of the hand performed when showing a round-shaped object, the last one is more specific about the yellow color involved. The description in patches can be seen as a very simple "language" that the system builds to economically describe what is happening. Every time a new event is perceived, the system recruits, as much as it can, existing patches in its repertoires to account for it.

Thus, if it is assumed that an interesting object can be moved, by opposition with features which are only part of the background, the results obtained by the dynamic recognition process may be used to bootstrap or refocus a process of static recognition.

When a dynamic event constituted by a movement has been reliably detected as being recurrent, the system immediately focuses its attention on the movement center identified in the module 110 of FIG. 7 and static pattern recognition achieved by a module 112 is triggered by triggering means 111 so that static patches which are at a predetermined distance d from the center of a reoccuring movement are analyzed to constitute at a given timestep a set of active patches.

Figure 3:
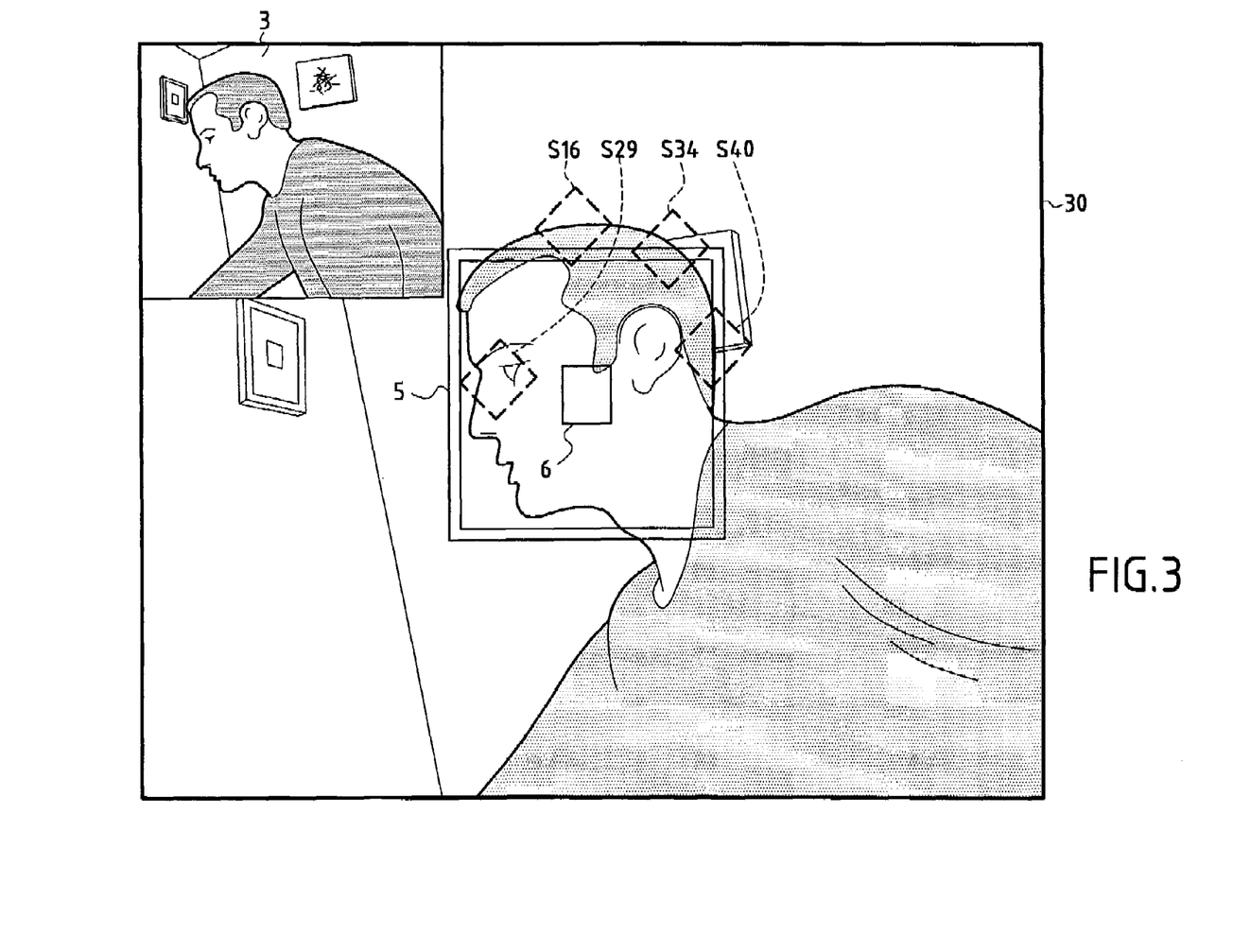
FIG. 3 is a picture given as an example for illustrating the construction of a set of active static patches during the detection of an event previously recognized by a dynamic patch set.

On FIG. 3 a known event corresponding to a hand movement has been detected (picture 3). In that case, four static patches are considered to be part of it (S16, S29, S34, S40).

The system may compute the frequency of each active static patch set in exactly the same manner as for the dynamic case. If some set is regularly involved in known movements, it is assumed that they correspond to an existing object. A static object is then created. It is defined by the set of static patches regularly perceived.

As soon as the first static object is constructed, the system looks at each timestep for it. It searches the patches detected during the image analysis, looking for the configuration corresponding to the definition of the object. The object, which was first constructed because it was part of a reoccuring movement, can now be detected even if it is not moving. In the example of FIG. 1, the system detects both a known movement (hand showing movement) and a known object (the ball).

Figure 4:
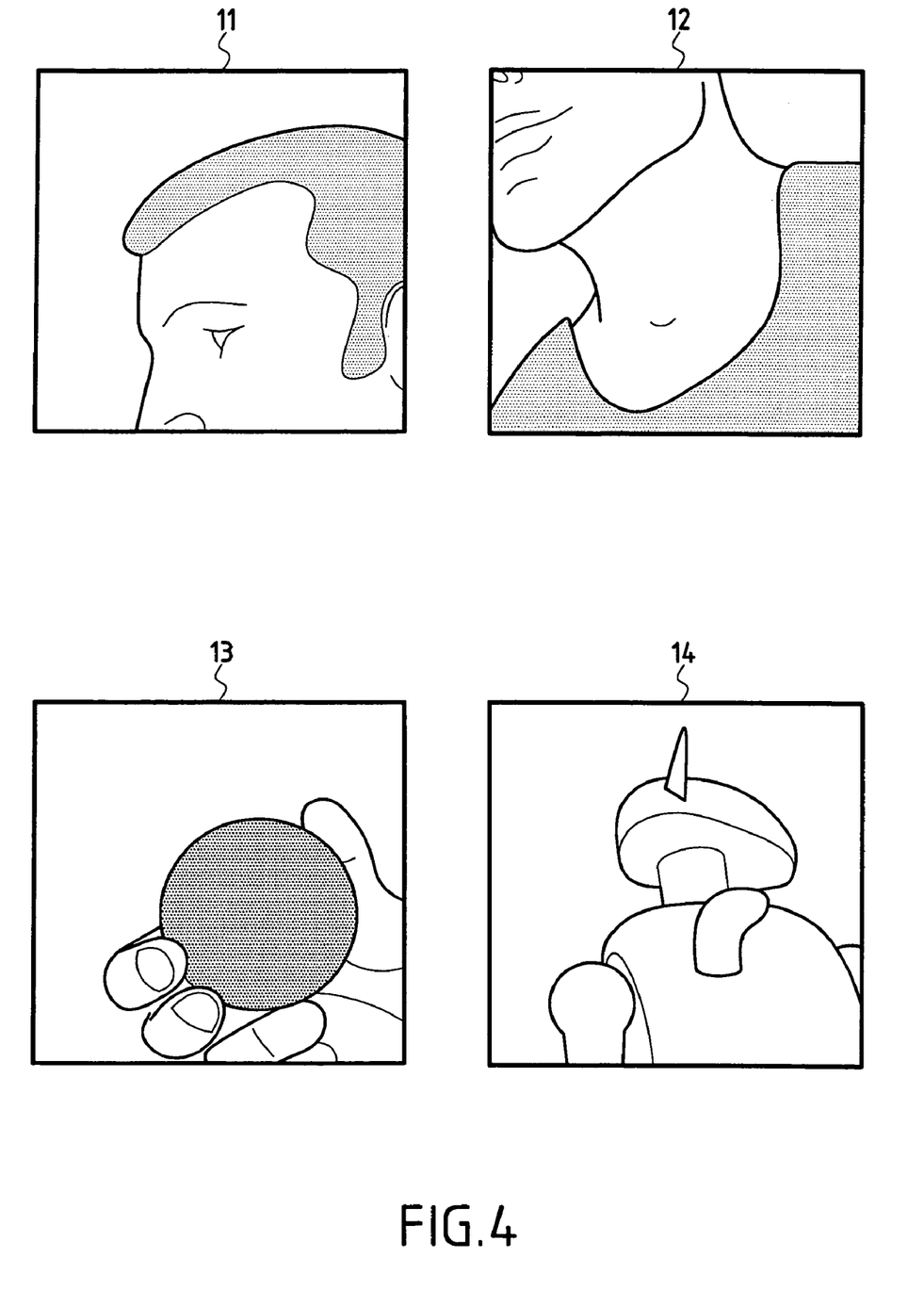
FIG. 4 shows examples of pictures of objects corresponding to static patch sets constructed during the process of event and object recognition.

FIG. 4 shows examples of objects corresponding to static patch sets which may be constructed by the system from pictures including the picture 30 of FIG. 3. Objects 11 to 14 represent respectively in this example a head, a neck, a ball and a dog shaped robot.

A specific example of static recognition system will be described herebelow:

Static patches are based on salient points in the visual perception $I_t$. For example, in a human face salient points may be the eyes and the mouth.

These salient points can be determined by, for instance, measuring the color change of a pixel compared to its neighbors. This is typically the method that is used for edge detection.

When a salient point (x,y) is detected, the region $R_{x,y}$ corresponding to the surrounding pixels is defined.

$R_{x,y}$=regionaround(x,y)

As in the dynamic case, different features may be extracted but according to a specific embodiment, a color model of the pixel of this region is computed. This will constitute a potential static path $S_{x,y}$ $S_{x,y}$=colordistribution($R_{x,y}$)

This patch is compared to the existing patches in the memory $M_d$. The closest patch $S_i$ in the memory is selected. If no sufficiently close patch exists, $S_{x,y}$ is added to the memory $M_d$.

$S_i$=closestpatch($S_{x,y}$, $M_s$)

At each timestep t, the system analyzes the image $I_t$ and produces a set of static patches $S_i$ for describing it. The larger the number of static patches, the better will be the recognition. But as this process goes on at every timestep, one must be careful of not producing an analysis which is too time consuming. Therefore, for performance sake, it can be wise to limit the number of possible static patches. This can be obtained in different ways.

1. By doing the analysis at a lower resolution.
2. By introducing a focus mechanism that only concentrates on a given part of the image for each timestep.
3. By specifying a minimal distance between each salient points.
4. By prefiltering the image, extracting parts that are more likely to contain interesting things (saturated or skin-toned color).
5. By limiting the salient points to a fixed number and only take the most salient ones.

Figure 5:
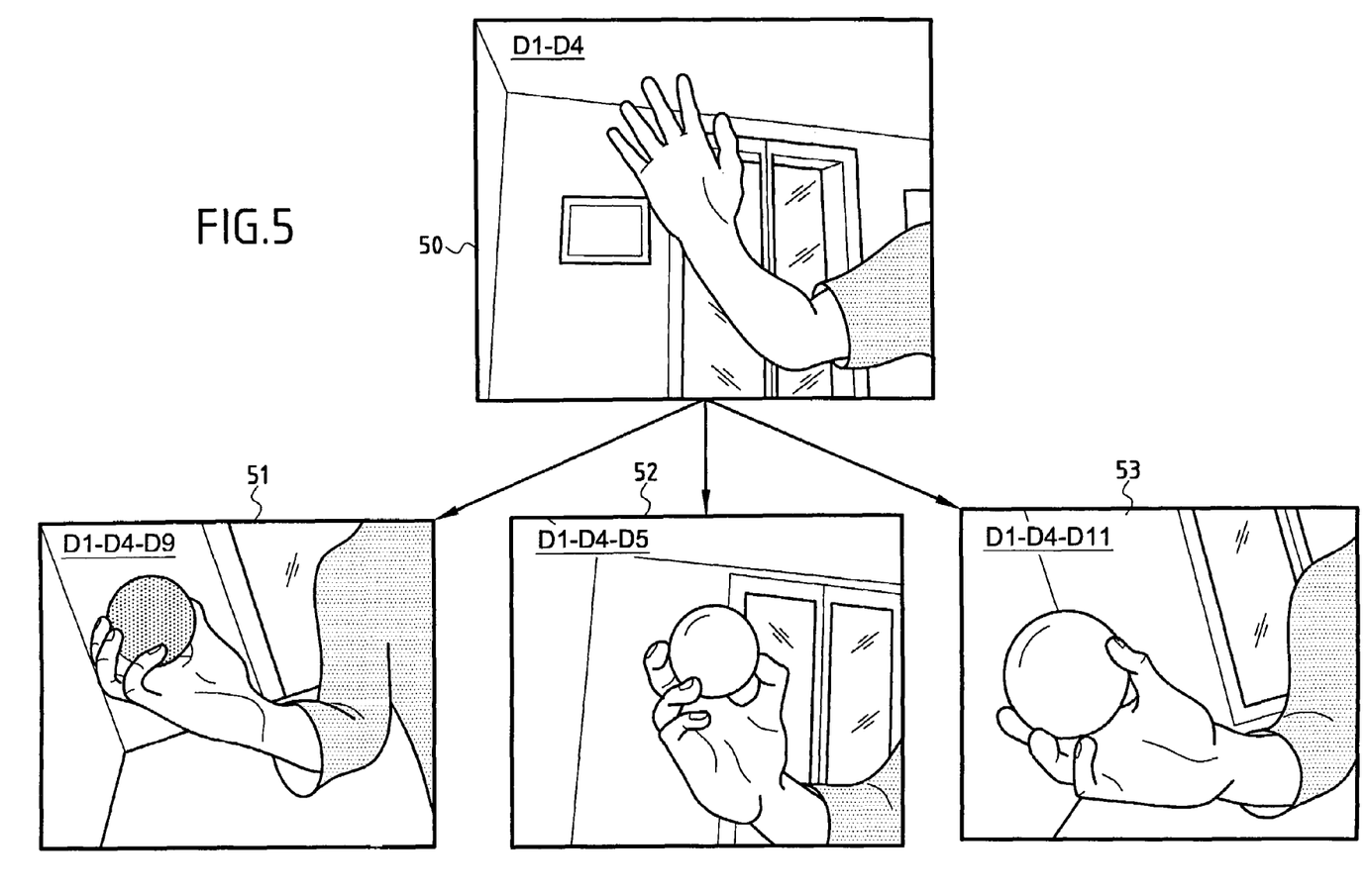
FIG. 5 shows a picture illustrating a reference movement identified by two stable patch sets and three further pictures illustrating further movements identified by three patch sets which are linked to the reference movement.

An example of an already recognized event E1 defined by a stable set of dynamic patches is illustrated on the picture 50 of FIG. 5. This example of event E1 is constituted by a movement of a hand defined by two dynamic patches $D_1$ and $D_4$.

Pictures 51, 52, 53 of FIG. 5 illustrate other events $E_2$, $E_3$, $E_4$ which are defined by other stable sets of dynamic patches, namely $D_1$-$D_4$-$D_9$, $D_1 D_4$-$D_5$ and $D_1$-$D_4$-$D_{11}$ respectively.

Pictures 51, 52, 53 show further movements of a hand with an object constituted by a ball which is held in the hand. Pictures 51 and 53 show very similar movements of hand with balls of different colors. Pictures 51 and 52 show slightly different movements of hand with balls of the same color.

The definitions of events $E_2$, $E_3$, $E_4$ all include dynamic patches $D_1$ and $D_4$ which define event $E_1$, and differ from the definition of event $E_1$ only by the addition of a third dynamic patch (respectively $D_9$, $D_5$, $D_{11}$). Thus, similarities may be identified between different events $E_1$, $E_2$, $E_3$, $E_4$ starting from their structure defined by a stable set of dynamic patches. Events $E_2$, $E_3$, $E_4$ may thus be recognized as belonging to the same family of similar events since they are all structurally related to another autonomous event $E_1$.

Figure 6:
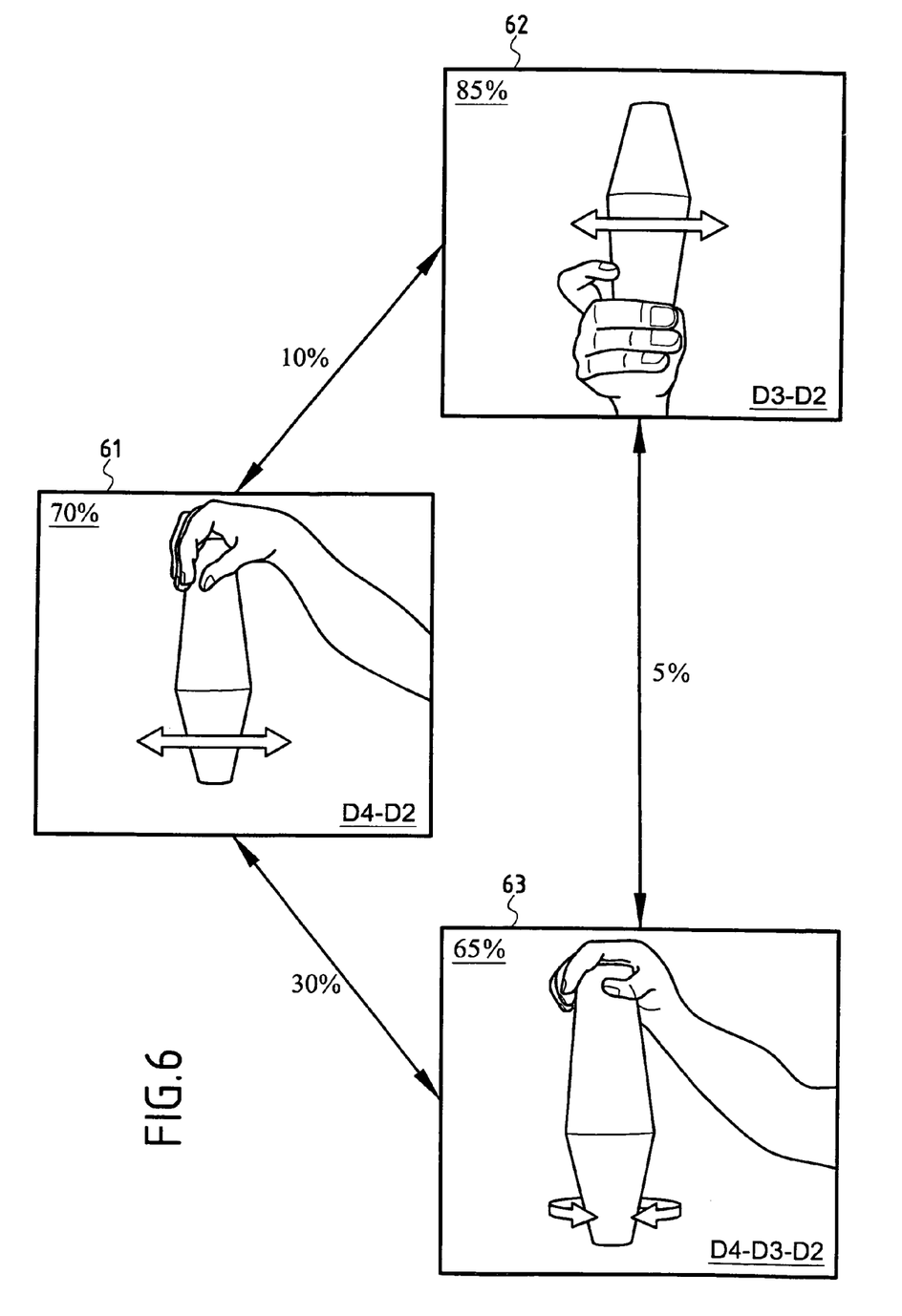
FIG. 6 shows the pictures illustrating different movements which may give rise to transitions from one movement to the other and enable the construction of a transition graph.

FIG. 6 illustrates another way of structuring the event space.

If an event $E_i$ defined by a stable set of dynamic patches is recognized at a time step $t_{-1}$, the system according to the present invention may observe the new situation created at a further timestep $t_2$ where an event $E_j$ defined by a stable set of dynamic patches is recognized.

If the time difference between $t_2$ and $t_1$ is smaller than a predetermined time interval $\Delta_t$ ($\Delta_t$ being itself far greater than the predetermined time delay $\tau_0$ between synchronized timesteps $t_{-1}$, t, $t_{+1}$, . . . and also greater than the integration time of a stable set of dynamic patches), then a transition is identified between events $E_i$ and $E_j$ and a transition arc is created. Progressively, a transition graph is constructed with transition arcs between events $E_i$, $E_j$, . . . defining movement types identified by stable sets of dynamic patches.

It may be noted that the same movement may be continued during a certain amount of time and a transition arc may exist between the similar event $E_i$ observed at different timesteps $t_1$, $t_2$. Transition arcs may as well be constructed between different events $E_i$, $E_j$ observed at successive timesteps $t_1$, $t_2$.

After a certain amount of time where different events have been observed several times, the frequencies of the observed transitions may be used to predict the probability that each identified transition occurs when the same situation is detected.

FIG. 6 shows three pictures 61, 62, 63 illustrating three different events $E_5$, $E_6$, $E_7$ respectively.

In the example of FIG. 6, picture 61 shows a hand holding an object from the top and imparting a movement to and fro, this movement constituting the event $E_5$ defined by a stable set of dynamic patches $D_4$, $D_2$.

Picture 62 shows a hand holding an object from the bottom and imparting a shaking movement, this movement constituting the event $E_6$ defined by a stable set of dynamic patches $D_3$, $D_2$.

Picture 63 shows a hand holding an object from the top and imparting a spinning movement, this movement constituting the event $E_7$ defined by a stable set of dynamic patches $D_4$, $D_3$, $D_2$.

Transition arcs are represented on FIG. 6 with the probabilities of each new transition computed from the already observed transitions and the frequencies thereof.

In this example, the probability that an event $E_5$ follows after itself is 70% whereas the probability that an event $E_7$ follows after an event $E_5$ is 30% and the probability that an event $E_6$ follows after an event $E_5$ is 10%. The probability that an event $E_6$ follows after itself is 85% whereas the probability that an event $E_5$ follows after an event $E_6$ is 10% and the probability that an event $E_7$ follows after an event $E_6$ is 5%. Finally, the probability that an event $E_7$ follows after itself is 65% whereas the probability that an event $E_5$ follows after an event $E_7$ is 30% and the probability that an event $E_6$ follows after an event $E_7$ is 5%.

The system according to the invention does not need to store huge amounts of data since patches or sets of patches are stored in memories $M_d$, $M_s$.

Moreover in case of need, some prototype patches $D_i$ which are not used in stable sets of patches may be eliminated at regular intervals to reduce the amount of data stored.

It has been checked that the system according to the invention may be implemented in embedded systems without too much processing power.

For example, the system may be incorporated in a robot equipped with a 492×362 pixels color CCD camera and connected to a separate computer through a wireless LAN. Such a computer may be for example a SONY VaioNote PCG CIXN running Linux.

The robot is evolving in unknown environments such as a house. In such conditions, traditional segmentation methods give very poor results, whereas the invention provides a significant improvement. In particular, if the system is used in an application in which the robot tries to learn the name of objects, a good mechanism for sharing attention about a particular object is a crucial component of the system. In a robot equipped with a system according to the invention, the impressionist vision module is coupled with an attention manager that controls the head of the robot. The robot may thus turn its head towards things that move and things it knows. As the bootstrapping process goes on, the robot displays its progress in recognition by showing a sharper attention behavior.

The invention claimed is:

1. An adaptive artificial vision method comprising the following steps:
  (a) defining successive couples of synchronized timesteps $(t_{-1}, t; t, t_{+1}; \ldots)$ such that the time difference $\tau$ between two synchronized timesteps $(t_{-1}, t; t, t_{+1}; \ldots)$ of a couple of synchronized timesteps is equal to a predetermined time delay $\tau_0$,
  (b) comparing two successive images $(I_{t-1}, I_t; I_t, I_{t+1}; \ldots)$ at each couple of synchronized timesteps $(t_{-1}, t; t, t_{+1}; \ldots)$ spaced by said predetermined time delay $\tau_0$ for obtaining a delta image $\Delta_t$ which is the result of the computation of the distance between each pixel of said two successive images $(I_{t-1}, I_t; I_t, I_{t+1}; \ldots)$ in view of characterizing movements of objects between said two successive images $(I_{t-1}, I_t; I_t, I_{t+1}; \ldots)$,
  (c) extracting features from said delta image $\Delta_t$ for obtaining a potential dynamic patch $P_t$ which is compared with dynamic patches previously recorded in a first repertory $R_d$ which is progressively constructed in real time from an initial void repertory,
  (d) selecting the closest dynamic patch $D_i$ in this first repertory $R_d$ or if not sufficiently close dynamic patch still exists, adding the potential dynamic patch $P_t$ to the first repertory $R_d$ and therefore obtaining and storing a dynamic patch $D_i$ from the comparison of two successive images $(I_{t-1}, I_t; I_t, I_{t+1}; \ldots)$ at each couple of synchronized timesteps $(t_{-1}, t; t, t_{+1}; \ldots)$, and
  (e) temporally integrating stored dynamic patches $D_i$ of the first repertory $R_d$ in order to detect and store stable sets of active dynamic patches representing a characterization of a reoccurring movement or event which is observed.

2. A method according to claim 1, wherein when stable sets of active dynamic patches representing a characterization of a reoccurring movement have been detected, the center of the movement is identified and static patches which are at a predetermined distance d from the movement center and are obtained by a process of static pattern recognition are analyzed to constitute at a given timestep a set of active static patches $S_i$ which are stored in a second repertory $R_s$.

3. A method according to claim 2, wherein stored patches $S_i$ of the second repertory $R_s$ are spatially integrated in order to detect and store stable sets of active static patches representing a characterization of an object which is recurrently involved in observed known reoccurring movements.

4. A method according to claim 2, wherein the process of static pattern recognition and production of static patches is initiated after stable sets of active dynamic patches representing a characterization of a reoccuring movement have been detected.

5. An adaptive artificial vision method comprising the following steps:
  (a) defining successive couples of synchronized timesteps $(t_{-1}, t; t, t_{+1}; \ldots)$ such that the time difference $\tau$ between two synchronized timesteps $(t_{-1}, t; t, t_{+1}; \ldots)$ of a couple of synchronized timesteps is equal to a predetermined time delay $\tau_0$,
  (b) comparing two successive images $(I_{t-1}, I_t; I_t, I_{t+1}; \ldots)$ at each couple of synchronized timesteps $(t_{-1}, t; t, t_{+1}; \ldots)$ spaced by said predetermined time delay $\tau_0$ for obtaining a delta image $\Delta_t$, which is the result of the computation of the distance between each pixel of said two successive images $(I_{t-1}, I_t; I_t, I_{t+1}; \ldots)$ in view of characterizing movements of objects between said two successive images $(I_{t-1}, I_t; I_t, I_{t+1}; \ldots)$,
  (c) extracting features from said delta image $\Delta_t$ for obtaining a potential dynamic patch $P_t$ which is compared with dynamic patches previously recorded in a first repertory $R_d$ which is progressively constructed in real time from an initial void repertory,
  (d) selecting the closest dynamic patch $D_i$ in this first repertory $R_d$ or if not sufficiently close dynamic patch still exists, adding the potential dynamic patch $P_t$ to the first repertory $R_d$ and therefore obtaining and storing a dynamic patch $D_i$ from the comparison of two successive images ($I_{t-1}$, $I_t$; $I_t$, $I_{t+1}$; ...) at each couple of synchronized timesteps ($t_{-1}$, $t$; $t$, $t_{+1}$; ...), and (e) temporally integrating stored dynamic patches Di of the first repertory $R_d$ in order to detect and store stable sets of active dynamic patches representing a characterization of a reoccurring movement or event which is observed, wherein when stable sets of active dynamic patches representing a characterization of a reoccurring movement have been detected, the center of the movement is identified and static patches which are at a predetermined distance d from the movement center and are obtained by a process of static pattern recognition are analyzed to constitute at a given timestep a set of active static patches $S_i$ which are stored in a second repertory $R_s$, and wherein the process of static pattern recognition and production of static patches is initiated at the same time as the process of dynamic movement recognition and production of dynamic patches and when stable sets of active dynamic patches representing a characterization of a reoccuring movement have been detected, the process of static pattern recognition is continued exclusively with static patches which are located in a restricted area of the image which is centered on said identified movement center.

6. A method according to claim 1, wherein during the computation of the distance between each pixel of two successive images ($I_{t-1}$, $I_t$), a filter function $f_{th}$ is used to keep only the most significant differences and therefore obtain a delta image $\Delta_t$ such that $$\Delta_t = f_{th}(\|I_t - I_{t-1}\|)$$

7. A method according to claim 6, wherein the filter function $f_{th}$ is a threshold function.

8. A method according to claim 1, wherein the step of extracting features from the delta image $\Delta_t$ comprises computing a gaussian color model of the distribution for each color component.

9. A method according to claim 1, wherein the step of extracting features from the delta image $\Delta_t$ comprises using histograms to model the distribution for color components, shape or texture.

10. A method according to claim 2, wherein static patches are obtained on the basis of salient points (x,y) in an image $I_t$ provided at a synchronized timestep t when a salient point (x,y) is detected, a region $R_{x,y}$ corresponding to the surrounding pixels is defined and features are extracted from this region $R_{x,y}$ to define a potential static patch $S_{x,y}$.

11. A method according to claim 10, wherein the extraction of features from the region $R_{x,y}$ comprises measuring the color change of a pixel compared to its neighbors and computing a color model of the color distribution in the region $R_{x,y}$.

12. A method according to claim 1, wherein successive steps of synchronized timesteps ($t_{-1}$, $t$; $T$, $T_{+1}$; ...) are separated by a period of time T which is equal to n times the predetermined time delay $\tau_0$, where n is an integer which is positive or equal to zero.

13. A method according to claim 12, wherein successive couples of synchronized timesteps ($t_{-1}$, $t$; $t$, $t_{+1}$; ...) are contiguous without any time interruption between two successive couples of synchronized timesteps ($t_{-1}$, $t$; $t$, $t_{+1}$).

14. A method according to claim 1, wherein it further comprises the step of detecting transitions between stable sets of active dynamic patches representing a characterization of reoccurring movements and of constructing transition graphs for predicting complex events comprising a sequence of identified movements.

15. An adaptive artificial vision system comprising:
a clock for defining successive couples of synchronized timesteps ($t_{-1}$, $t$; $t$, $t_{+1}$; ...) such that the time difference $\tau$ between two synchronized timesteps ($t_{-1}$, $t$; $t$, $t_{+1}$; ...) of a couple of synchronized timesteps is equal to a predetermined time delay $\tau_0$, inputting means for inputting images ($I_{t-1}$, $I_t$; $I_t$, $I_{t+1}$; ...) provided by a camera at said synchronized timesteps ($t_{-1}$, $t$; $t$, $t_{+1}$; ...), first comparator means for comparing two successive images ($I_{t-1}$, $I_t$; $I_t$, $I_{t+1}$; ...) inputted at each couple of synchronized timesteps ($t_{-1}$, $t$; $t$, $t_{+1}$; ...) spaced by said predetermined time delay $\tau_0$ for obtaining a delta image $\Delta_t$ which is the result of the computation of the distance between each pixel of said two successive images ($I_{t-1}$, $I_t$; $I_t$, $I_{t+1}$; ...), first memory means ($M_d$) for storing dynamic patches Di representing elementary visual parts for describing characterized movements of objects, feature extraction means for extracting features from said delta image $\Delta_t$ and producing a potential dynamic patch $P_t$, second comparator means for comparing a potential dynamic patch $P_t$ which is compared with dynamic patches previously recorded in said first memory means ($M_d$), selection means for selecting the closest dynamic patches $D_i$ in the first memory means ($M_d$) or if no sufficiently close dynamic patch still exists, for recording the potential dynamic patch $P_t$ into the first memory means so that a dynamic patch $D_i$ is stored in the first memory means for each comparison of two successive images ($I_{t-1}$, $I_t$; $I_t$, $I_{t+1}$; ...) at each couple of synchronized timesteps ($t_{-1}$, $t$; $t$, $t_{+1}$; ...), first temporal integrations means comprising computing means for computing during a time $T_{F1}$ corresponding to a predetermined number N1 of couples of synchronized timesteps the frequency of each dynamic patch $D_i$ stored in the first memory means and threshold means for defining a set of active dynamic patches comprising dynamic patches D1 whose frequency is higher than a predetermined threshold, and, second temporal integration means comprising computing means for computing during a time $T_{F2}$ corresponding to a predetermined number N2 of couples of synchronized timesteps the frequency of each set of defined active dynamic patches and threshold means for defining a stable set of dynamic patches corresponding to a reoccuring movement for each set of active dynamic patches whose frequency is higher than a predetermined threshold.

16. A system according to claim 15, wherein it further comprises means for identifying the center of a reoccuring movement represented by a stable set of active dynamic patches and means for triggering static pattern recognition for analyzing static patches which are at a predetermined distance d from said center of a reoccuring movement.

* * * * *